S. Sauerman,
Apple Corer and Cutter.
N°48,981. Patented July 25, 1865.
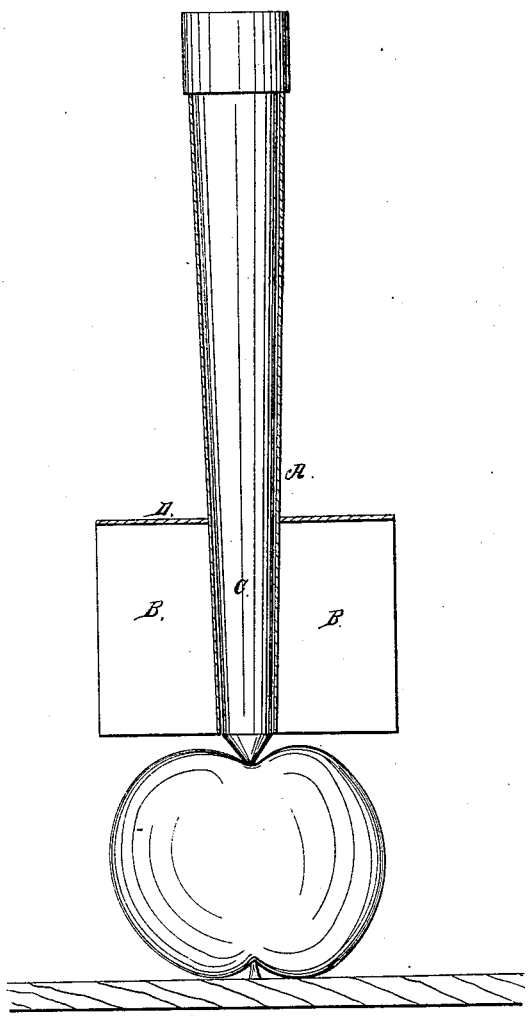
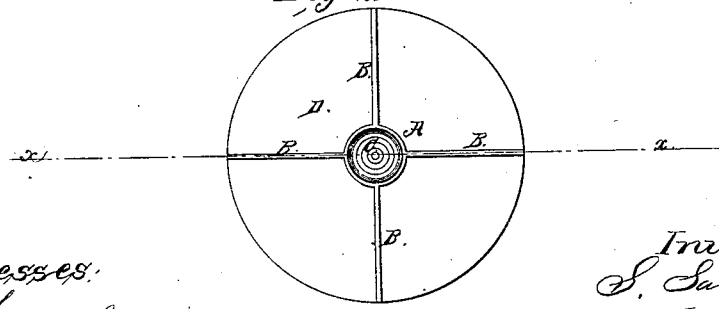

United States Patent Office.

SAMUEL SAUCERMAN, OF FREEPORT, ILLINOIS.

IMPROVED APPLE CORER AND SLICER.

Specification forming part of Letters Patent No. 48,981, dated July 25, 1865.

*To all whom it may concern:*

Be it known that I, SAMUEL SAUCERMAN, of Freeport, in the county of Stephenson and State of Illinois, have invented a new and Improved Implement for Coring and Quartering Apples; and I do hereby declare that the following is a full, clear, and exact description thereof, which will enable those skilled in the art to make and use the same, reference being had to the accompanying drawings, forming part of this specification, in which—

Figure 1 represents a longitudinal vertical central section of this invention, taken in the plane indicated by the line $xx$, Fig. 2. Fig. 2 is an inverted plan of the same.

Similar letters of reference indicate like parts.

The object of this invention is a simple, cheap, and effective device by which apples, after the same have been pared, can be cored and quartered by one operation and with little loss of time.

The improvement consists of a tube or circular cutter, made of tin or other suitable material, slightly tapering from the cutting-edge up and pointed, with four straight knives or wings projecting from its circumference at right angles to each other, in combination with a plunger, which serves to guide the tubular cutter, while passing through the apple, in such a manner that by placing an apple on a platform, stem down, with the point of the plunger upon the blow, and depressing the cutter with a quick motion, the operation of coring and slicing is performed with great ease and rapidity.

A represents the tubular cutter, which is made of tinned sheet-iron, or any other suitable material, slightly tapering from the cutting-edge up, as clearly shown in Fig. 1 of the drawings, so that the cores will readily discharge from it. From the periphery of this tubular cutter project four or more wings, B, at right angles to each other, as clearly shown in Fig. 2. The lower edges of these wings are sharp, so that the same will readily pass through the apple, and their number, height, and width is made according to the size of apples to be sliced. They are held in position by a top plate, D, which is secured to the tubular cutter or corer A, and to the upper edges of said quartering-knives, as shown.

A plunger, C, of wood or any other suitable material, is fitted in the tubular corer A, and the lower end of this plunger is pointed, so that the same can be readily held in the cavity generally formed round the blows of apples.

The apple to be cored and sliced is laid down upon a platform or table, stem down, the point of the plunger is placed on the blow, and by depressing the corer the apple is cored and quartered by one operation.

This implement can be made at a trifling expense, the corer and slicing-knives being made of tinned sheet-iron and the plunger of wood, and when properly treated it is not liable to get out of order. The cutting-edges, when once dull, can be readily sharpened by means of a file, and the whole device is light and easily handled.

I claim as new and desire to secure by Letters Patent—

The pointed plunger C, in combination with the pointed tubular corer A, slicing-knives B, and top plate, D, constructed and operating as and for the purpose set forth.

SAMUEL SAUCERMAN.

Witnesses:
T. F. GOODHUE,
A. NASH.